May 14, 1940.　　　A. OSTWALD　　　2,200,428
ADJUSTABLE METHOD OF CONNECTING TWO FABRICS
Filed March 30, 1937　　　4 Sheets-Sheet 1
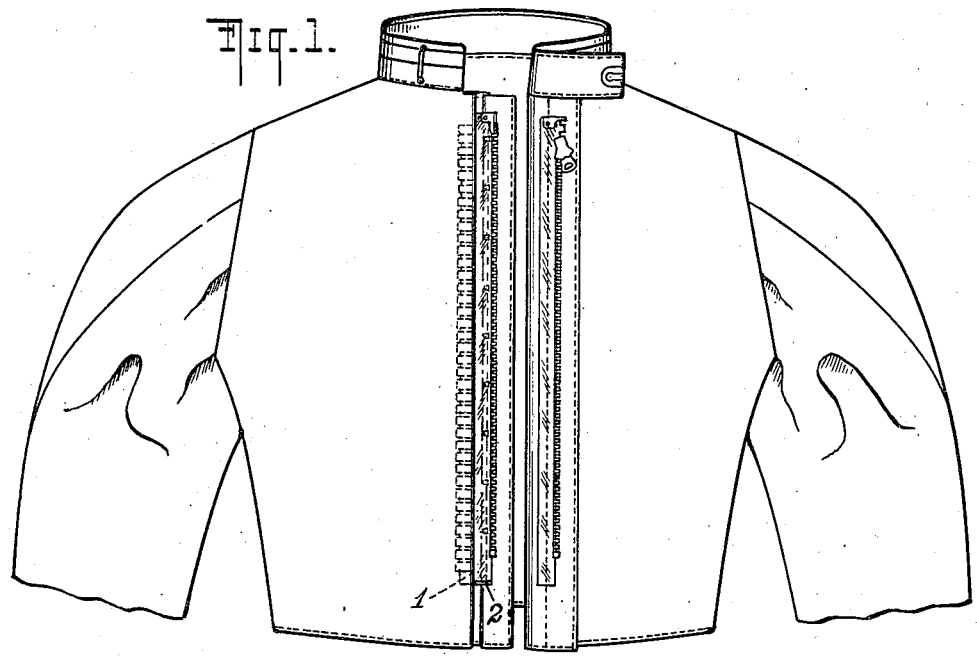
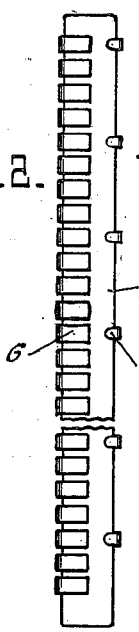  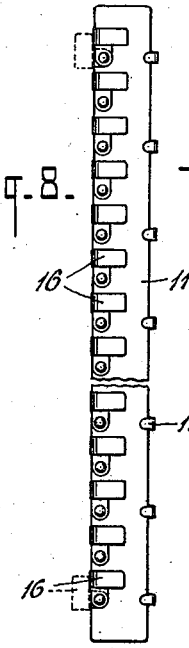 
INVENTOR May 14, 1940.  A. OSTWALD  2,200,428
ADJUSTABLE METHOD OF CONNECTING TWO FABRICS
Filed March 30, 1937  4 Sheets-Sheet 2
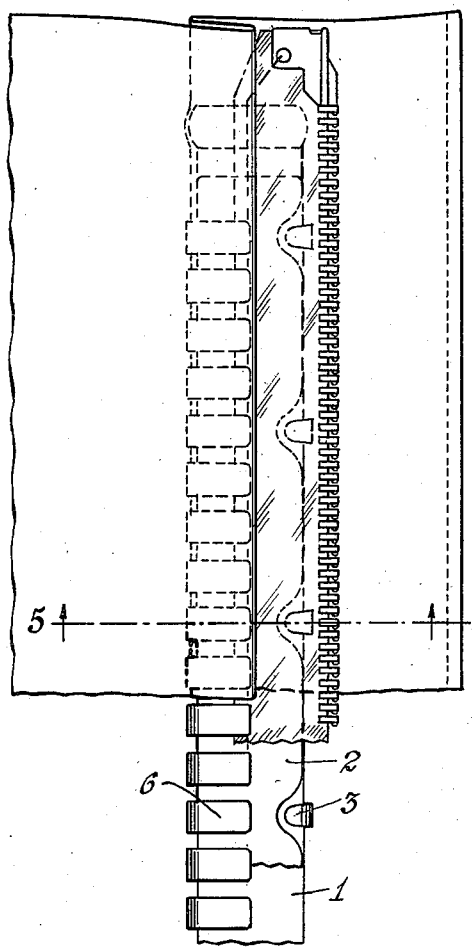
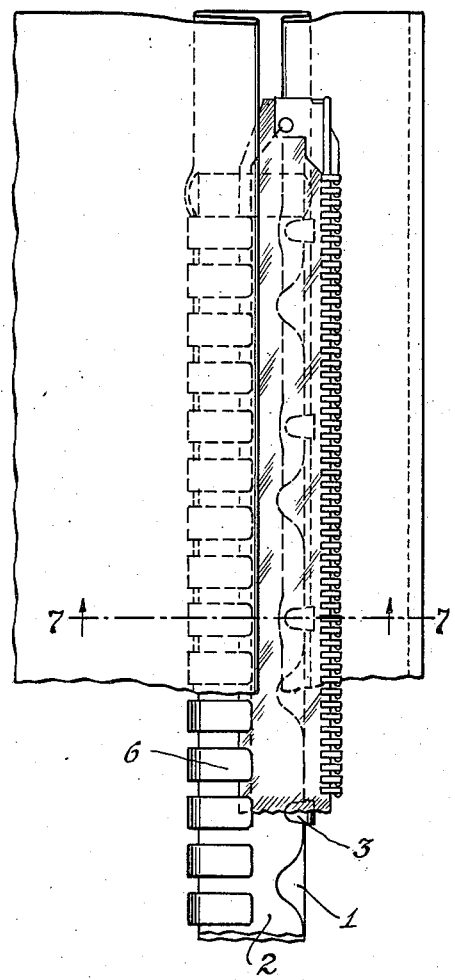
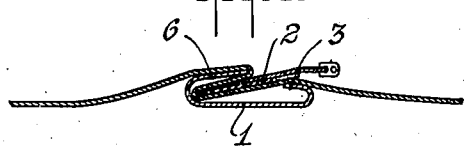
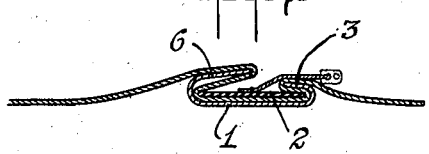
INVENTOR May 14, 1940.　　　A. OSTWALD　　　2,200,428
ADJUSTABLE METHOD OF CONNECTING TWO FABRICS
Filed March 30, 1937　　4 Sheets-Sheet 3

INVENTOR
Adolph Ostwald

May 14, 1940.  A. OSTWALD  2,200,428
ADJUSTABLE METHOD OF CONNECTING TWO FABRICS
Filed March 30, 1937  4 Sheets-Sheet 4
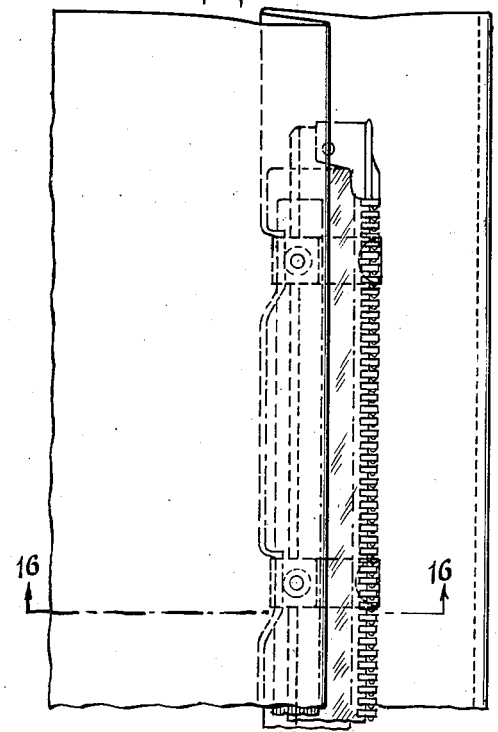
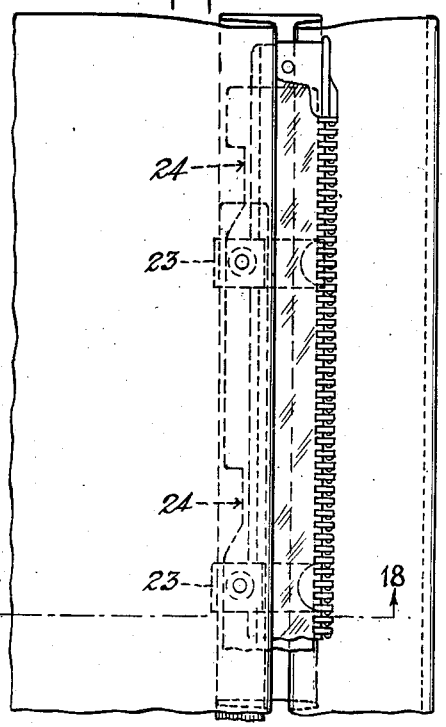
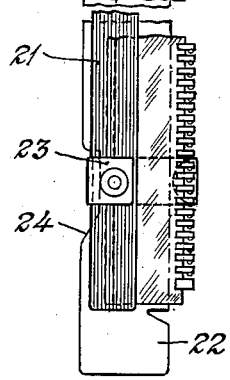
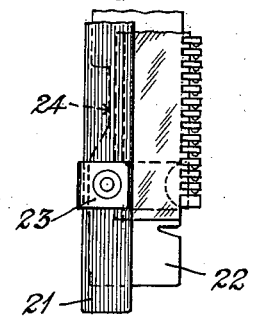
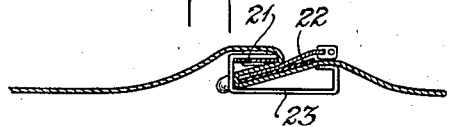
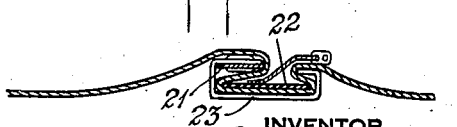
INVENTOR Patented May 14, 1940

2,200,428

UNITED STATES PATENT OFFICE 2,200,428

ADJUSTABLE METHOD OF CONNECTING TWO FABRICS

Adolph Ostwald, New York, N. Y.

Application March 30, 1937, Serial No. 133,757

4 Claims. (Cl. 2—265)

The purpose of the invention is to make it possible to adjust the size of the two fabrics connected, that is make them longer or shorter, wider or narrower, bigger or smaller, as desired. The invention can be combined with other methods of closing such as a "zipper", strip of snap fasteners or hooks and eyes, buttons and buttonholes, or any other fastening method. One of these methods could be used for instance to adjust the length of curtains to different size windows, without cutting or sewing seams. In such articles where elastic is used, which will in the course of time stretch out of shape, this method can be used to take up the slack.

This invention is particularly suitable for providing a quick means of letting out and taking up garments circumferentially, without tailoring, in such manner as to secure good fit and comfort and to permit freedom of movement at all times. Sleeve cuffs and trouser bottoms could be lengthened or shortened by this method.

This method of adjusting a garment is accomplished by means of a "zipper" which is attached to a bar, and this bar in turn is inserted into a channel which holds the "zipper" firmly in place wherever desired.

In the drawings:

Fig. 1 is a rear view of a coat, with the invention embodied therein. The right side of the "zipper" is sewed into the garment and remains stationary, although if preferred this part of the "zipper" could also be made removable in the same manner as the left side. The left side is shown with the adjustable feature and the surplus of the material protects the wearers back and undergarments from the "zipper". The sewed in, stationary "zipper" on the right side is attached far enough away from the edge so that when the garment is closed the "zipper" is invisible.

Fig. 2 is a face view on a large scale of the channel bar, showing clamps on both sides.

Fig. 3 is a face view of the "zipper" bar showing in dotted lines evenly spaced notches to match the clamps at the right side of the channel bar. The top of the "zipper" bar is widened.

Figure 10:
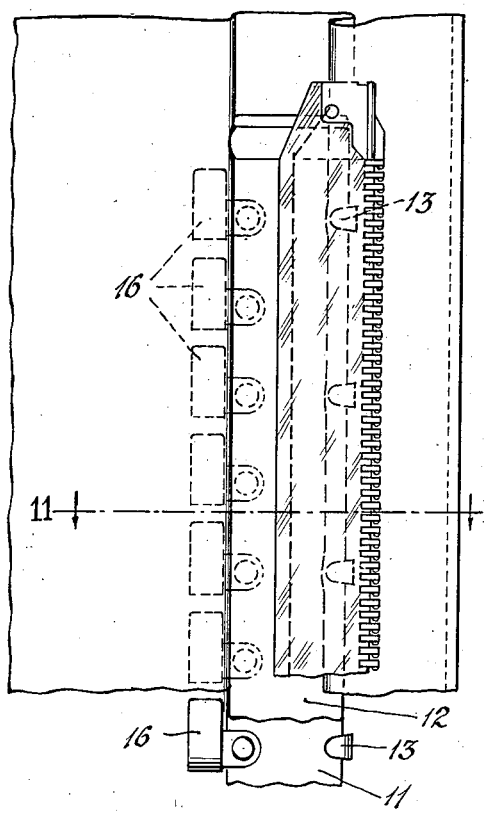

Fig. 4 is a face view of the channel bar covered by cloth. The "zipper" bar is inserted over the cloth into the left side of the channel bar in the position where the notches of the "zipper" bar match the clamps at the right of the channel bar. The lower part of the drawing shows the fabric and the "zipper" torn away, to illustrate the position of the "zipper" bar in the channel, at the point where the notch matches the clamp.

Fig. 5 is a cross section on the line 5—5 of Fig. 4. The "zipper" bar is only inserted in the left side of the channel bar and not as yet forced into the clamp at the right of the channel bar.

Fig. 6 is a face view showing the complete insertion of the "zipper" bar. The "zipper" bar has been pressed into the clamp at the right of the channel bar, and pulled down so that the wider portion of the "zipper" bar holds it firmly in place. The widened top of the "zipper" bar prevents it from being pulled too far. The lower part of the drawing shows the fabric and "zipper" torn away, to illustrate the position of the "zipper" bar in the channel after it has been pulled down.

Fig. 7 is a cross section on the line 7—7 of Fig. 6. The "zipper" bar is now entirely inserted in the channel, showing the material firmly pressed against the inside of the channel by the "zipper" bar, hence preventing the fabric from moving out of position.

Fig. 8 is a face view on a large scale of the channel bar, showing a different construction. The clamps at the right remain the same. The clamps at the left, instead of being stationary are movable. The dotted lines indicate the position of the clamp when open.

Fig. 9 is a face view of the "zipper" bar showing the bar with even width except for the widened portion at the top.

Fig. 10 is a face view of the channel bar with the movable clamps covered by cloth. The clamps are open. The "zipper" bar is inserted in the clamps at the right side of the channel bar. The bottom of the drawing shows the fabric and the "zipper" torn away to illustrate the position of the "zipper" bar inserted in the clamp at the right of the channel bar, with the clamp at the left of the channel bar open.

Figure 11:
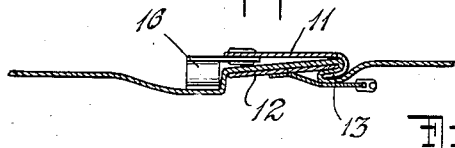

Fig. 11 is a cross section on the line 11—11 of Fig. 10. The "zipper" bar is inserted in the right clamp of the channel bar and the clamp at the left is shown open.

Figure 12:
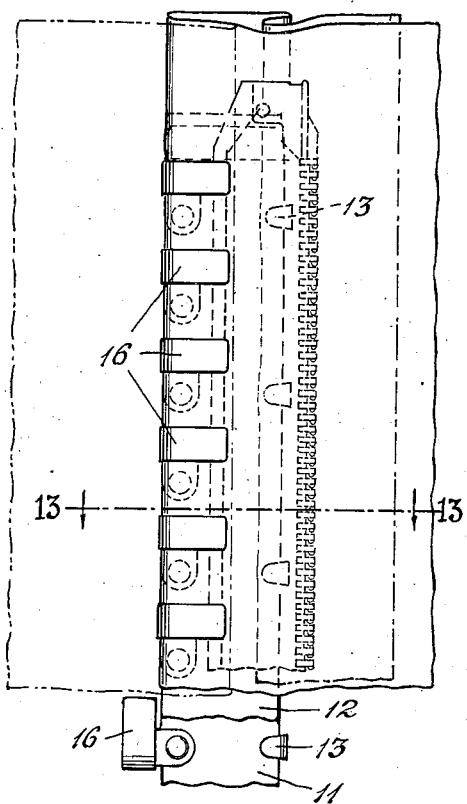

Fig. 12 is a face view of the "zipper" bar inserted in the channel bar. The material which was shown in heavy lines at the left of Fig. 10 is here folded over to the right, the original position indicated by the dotted line at the left of Fig. 12. The movable clamps have then been closed, pressing the material close over the "zipper" bar, thus holding the "zipper" bar and material firmly in place, preventing both from moving their position. The lower clamp at the left of the channel bar is still open.

Figure 13:

Fig. 13 is a cross section on the line 13—13 of

Fig. 12. The "zipper" bar is shown with the clamp at the left of the channel bar closed. When closing the clamps the material is folded over as indicated in the heavy line and is then allowed to return to the position shown by dotted lines.

Figure 14:
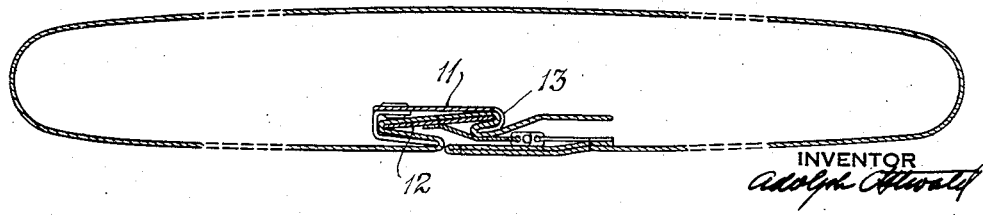

Fig. 14 is a cross section of the circumference of a garment. The adjustment feature is shown in the same position as in Figure 13, excepting that the "zipper" is shown closed with the stationary half at the right side of the garment.

Fig. 15 is a face view of a modified construction of the channel bar, covered by cloth. The "zipper" bar is inserted over the cloth into the left side of the channel bar into the position where the notches of the "zipper" bar match the clamps of the channel bar. The lower part of the drawing shows the fabric removed and illustrates the position of the "zipper" bar in the channel at the point where the notches match the clamps. To facilitate the correct position for the insertion of the "zipper" bar, there has been cut a V-nick near the bottom end of the "zipper" bar. If, this V-nick is parallel to the bottom edge of the channel bar, the notches of the "zipper" bar will be opposite the clamps of the channel bar.

Fig. 16 is a cross section on the line 16—16 of Figure 15. The "zipper" bar is only inserted in the left side of the channel bar and not as yet forced into the clamp at the right of the channel bar.

Fig. 17 is a face view showing the complete insertion of the "zipper" bar into the channel bar. The "zipper" bar has been pressed into the clamp of the channel and pulled up so that the wider portion of the "zipper" bar entirely fills the clamp from the left to the right. The lower part of the drawing shows the fabric removed and illustrates the position of the "zipper" bar after it has been pulled up and brought into the final position.

Fig. 18 is a cross section on the line 18—18 of Fig. 17. The "zipper" bar is now entirely inserted in the channel bar showing the material firmly pressed against the inside of the clamp by the "zipper" bar, hence preventing the fabric from moving out of position.

Referring in detail to the drawings, Figs. 4, 5, 6 and 7, the adjustable method is comprised of a member 1, the channel bar, and member 2, the "zipper" bar. In a cross-section view the channel bar 1 has a rectangular shape with an opening off center in the top of the rectangle as seen in Figs. 5 and 7. The left part of the top 6 is longer than the right part of the top 3. After the insertion of the "zipper" bar 2, this bar has the tendency to pull towards the right part 3. If both parts 6 and 3 would have the same length, the "zipper" bar would have the tendency to pull out through the opening. By having the part 6 longer, the "zipper" bar is prevented from pulling out. Also the part 6 is higher than the part 3. This makes it easier to insert the "zipper" bar 2 into the part 6 of the channel bar, especially when the thickness of the fabric has to be considered.

In the face view of the Figs. 4 and 6 the left top part 6 of the channel bar 1 is divided into a number of equal sections as shown in Figure 2. This is done to make the channel bar flexible. The right top part 3 of the channel bar consists of a number of hooks placed at intervals. The purpose of these hooks is to take up the pressure of the "zipper" bar 2. In other words it is at this point where the "zipper" bar 2 transfers the pressure or pull to the channel bar 1, and this channel bar in turn transfers the pull to the cloth.

A modified construction is illustrated in Figs. 8 and 9 and shows the two bars 11 and 12 of the adjustable method with movable clamps 16. These clamps take the place of part 6 in the previous method and differ, in that they can move out on a pivot away from the channel bar. This method permits the use of a "zipper" bar in full width in its entire length, and notches are not necessary. The clamps 16 turn back on the channel bar 11 over the "zipper" bar 12, holding the "zipper" bar in place as illustrated in Figs. 10 and 12. The hooks 13 in this method remain the same as number 3 in the first method of construction mentioned.

Another modification is shown in Figs. 15, 16, 17 and 18. The left top part of the channel bar is constructed in one solid bar of spring steel, 21. In this case the hooks 23 are combined with the spring steel bar in the shape shown in the cross section view, Figs. 16 and 18. The opening at the top remains the same, as described in the first construction method. The combined hook 23 is fastened to the spring steel bar or could be made in one piece with the spring steel bar. The edge of this spring steel bar, being in one piece, gives an even edge, whereas in the other methods the divisions in the left top part of the channel bar give a wavy edge. This method is preferable as it is simpler in construction and better in appearance.

The "zipper" bar 22 has regular spaced notches 24 to match the position of the hooks 23 in the channel bar. These notches may be either in the left or the right side of the "zipper" bar. After the "zipper" bar 22 is inserted into the channel bar 21, the "zipper" bar is pulled up until the widened portion of the "zipper" bar contacts the hooks 23 of the channel bar. This action locks the "zipper" bar 22 firmly in the channel bar 21, since the wider parts of the "zipper" bar 22 between the notches 24 take up the entire space of the inside of the channel hooks 23. The bar 22, here called the "zipper" bar, does not necessarily have to be used with a "zipper." It can also be used with any other means of fastening and can even be used without any other means of fastening other than the bar itself.

In such cases where it is not necessary to continuously open the connection of the two fabrics, this method can be used without a "zipper" or other means of fastening. In this case the two sides of the fabrics are placed face to face. The channel bar 21 is placed underneath and the "zipper" bar 22 is inserted into the channel bar 22 on the top of the fabrics. When the two fabrics are then pulled in opposite directions the fastening lies flat.

When this method of adjustment is used in the back of a garment having a standing collar to permit changes in size, it becomes necessary also to change the size of the stiff collar. This is accomplished by an extension of the standing collar beyond the edge of the coat. A stationary hook is placed on this extension. The other side of the collar is outfitted with a bridge which is attached to the collar by means of screw posts. This makes it possible to place the bridge wherever desired.

I do not limit myself to any particular construction method or shape of the essential parts realizing that many changes can be made without departing from the principle of my invention.

Having thus described my invention what I desire to claim and secure by United States Letters Patent is:

1. An adjustable mounting for attaching fasteners to fabrics comprising an elongated strip of flexible material, a plurality of substantially C-shaped members attached thereto and forming a partially-closed mouth channel therealong, a co-operating flexible bar having a plurality of fastening elements attached thereto, said bar being substantially wider than the mouths of said members and adapted to be fitted therethrough into said channel to engage the said fabric in said channel.

2. An adjustable mounting for attaching fasteners to fabrics comprising an elongated strip of flexible material, a plurality of substantially C-shaped members attached at intervals therealong, one of the jaws of each of said members being slightly longer and higher than the other, a co-operating flexible bar having a plurality of fastening elements attached thereto, said bar being substantially wider than the opening between said jaw and adapted to be fitted therethrough to engage said fabric tightly in said channel.

3. An adjustable mounting as set forth in claim 1, the jaws along one side of said members being slightly longer and higher than those along the other, the said strip being attached to the longer and higher of said jaws.

4. An adjustable fastening means for holding panels of fabric together, comprising a flexible elongated strip, a plurality of substantially C-shaped members attached to said strip to form a partially closed mouth channel therealong, an elongated bar of flexible material substantially wider than the mouth openings of said C-shaped members, and adapted to be fitted sidewise therethrough into the channel formed by said C-shaped members whereby the fabric of said panels is engaged tightly between said bar and the inside of said channel, the jaw forming one side of each of said C-shaped members being slightly higher than the jaw on the other side.

ADOLPH OSTWALD.